United States Patent
Miyata

(10) Patent No.: US 7,705,904 B2
(45) Date of Patent: Apr. 27, 2010

(54) MOVING-IMAGE RECORDING DEVICE FOR RECORDING MOVING IMAGE

(75) Inventor: Akira Miyata, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 836 days.

(21) Appl. No.: 11/304,969

(22) Filed: Dec. 14, 2005

(65) Prior Publication Data

US 2006/0132636 A1    Jun. 22, 2006

(30) Foreign Application Priority Data

Dec. 17, 2004    (JP)    ............................. 2004-365206

(51) Int. Cl.
H04N 5/222    (2006.01)
H04N 5/225    (2006.01)
(52) U.S. Cl. ............................. 348/333.05; 348/207.99
(58) Field of Classification Search .............. 348/220.1, 348/333.1–333.12, 207.99, 333.01–333.05; 386/8
See application file for complete search history.

(56) References Cited

U.S. PATENT DOCUMENTS

| | | | | |
|---|---|---|---|---|
| 6,466,262 | B1 * | 10/2002 | Miyatake et al. ............ | 382/284 |
| 6,493,027 | B2 | 12/2002 | Ohta et al. | |
| 2003/0112357 | A1 * | 6/2003 | Anderson .............. | 348/333.05 |
| 2003/0189647 | A1 * | 10/2003 | Kang ..................... | 348/207.99 |
| 2003/0193602 | A1 * | 10/2003 | Satoh et al. ............ | 348/333.12 |
| 2004/0109067 | A1 * | 6/2004 | Yokoi ..................... | 348/220.1 |
| 2005/0204288 | A1 * | 9/2005 | Clapper .................... | 715/723 |

FOREIGN PATENT DOCUMENTS

| | | |
|---|---|---|
| JP | 7-99628 A | 4/1995 |
| JP | 9-312818 A | 12/1997 |
| JP | 10-28250 A | 1/1998 |
| JP | 2000-78452 A | 3/2000 |
| JP | 2001-157152 A | 6/2001 |
| TW | 533707 A | 5/2003 |
| TW | I225360 A | 12/2004 |

OTHER PUBLICATIONS

Japanese Office Action dated Dec. 9, 2008 and English translation thereof issued in counterpart Japanese Application No. 2004-365206.
Japanese Office Action dated Mar. 10, 2009 (3 pages), and English translation thereof (4 pages), issued in counterpart Japanese Application Serial No. 2004-365206.

* cited by examiner

*Primary Examiner*—Lin Ye
*Assistant Examiner*—Euel K Cowan
(74) *Attorney, Agent, or Firm*—Frishauf, Holtz, Goodman & Chick, P.C.

(57) ABSTRACT

Object images taken for a predetermined period before a shutter key is pressed are stored in a buffer. During the period, past object images taken at every one second are read from the buffer, the read images are displayed in predetermined areas in a through image, and the images in the areas are updated. When the shutter key is pressed, a moving image for the predetermined period is generated from the object images stored in the buffer. Thereby, in a digital camera which records images for a predetermined period acquired just before as the moving image, it is possible to precisely determine a timing to perform the recording and saving instruction.

9 Claims, 6 Drawing Sheets

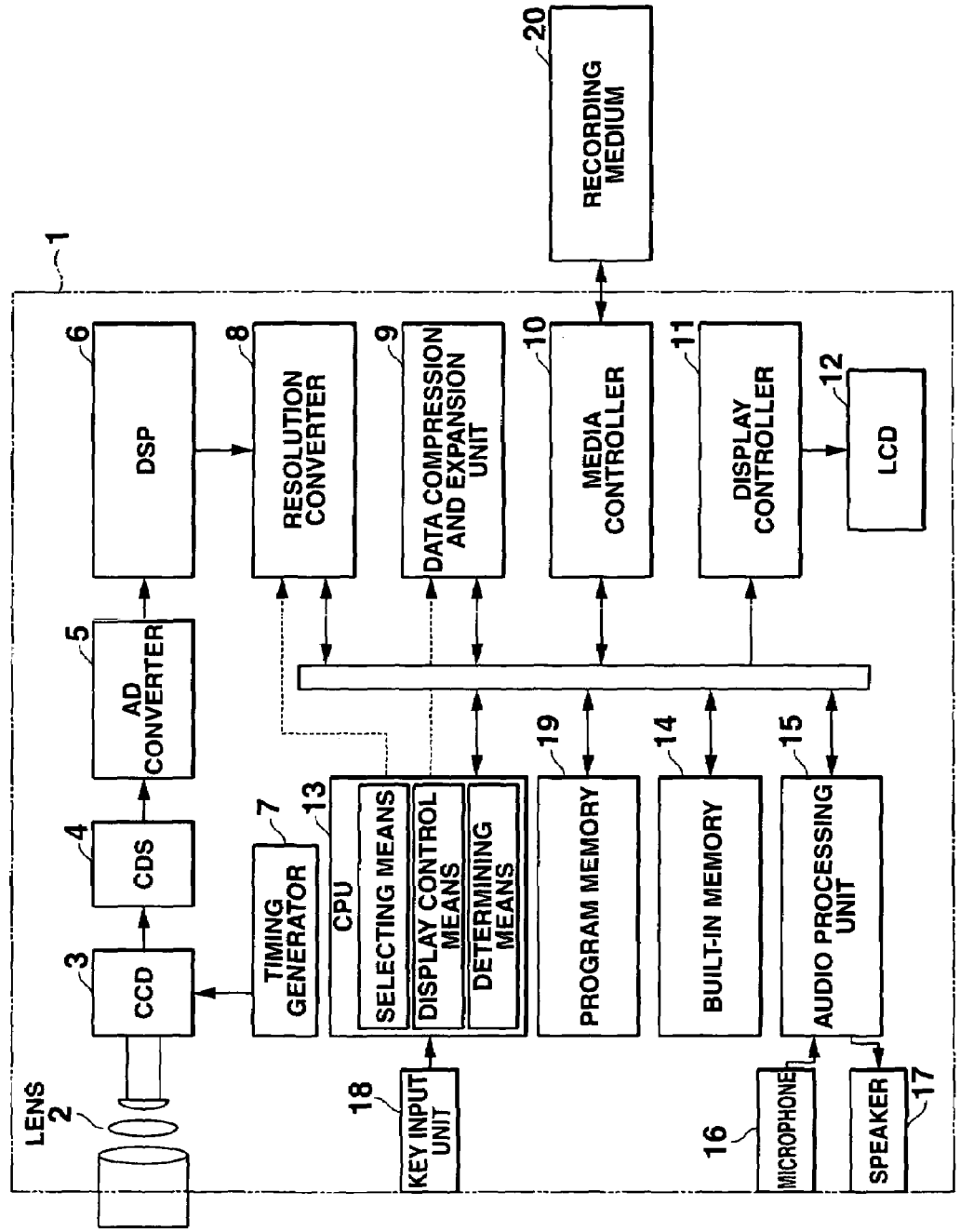

MOVING-IMAGE RECORDING DEVICE FOR RECORDING MOVING IMAGE

CROSS-REFERENCE TO RELATED APPLICATIONS

This application is based upon and claims the benefit of priority from prior Japanese Patent Application No. 2004-365206, filed Dec. 17, 2004, the entire contents of which are incorporated herein by reference.

BACKGROUND OF THE INVENTION

1. Field of the Invention

The present invention relates to a moving-image recording device for recording a moving image, and more specifically, to a moving-image recording device and a moving-image recording method used for a digital camera capable of recording the moving image acquired before a recording instruction.

2. Description of the Related Art

Conventionally, a technology for retro activating a time for click of a shutter even when the time for the click of the shutter has been missed, or a shutter timing has been failed in a digital camera that images and records an object by use of an image pickup element such as a CD or a CMOS sensor has been proposed by the present applicant (Jpn. Pat. Appln. KOKAI Publication No. 2000-78452).

In such a technology, a predetermined number of object images taken at even intervals are temporarily stored (cyclically stored) in a buffer such as a semiconductor memory in a recording standby state while sequentially updating them. Stated another way, a temporary storage area (buffer) of a predetermined size is provided in a memory. Object images (frame images) which are cyclically captured are sequentially stored in an empty area of the buffer. Each time when the buffer is full of data (the empty area does not remain), the oldest object image (frame image) is deleted from the buffer to keep the empty area for a new object image (frame image). Then, for example, when a shutter timing has been failed (the time for the click of the shutter has been missed), its user is prompted to perform a switching operation to a shutter timing retroaction mode. In this mode, on a monitor screen that displays a through image of the object in the recording standby state, a series of object images temporarily stored in a buffer memory are displayed sequentially in accordance with key operations, whereby the user is made to select an image at a past arbitrary recording timing desired by the user. Thereafter, the selected image is recorded as a shot image into an image recording medium such as a semiconductor memory card. To store a moving image which is captured before the shutter operation (release operation) is called a PAST capture mode.

On the other hand, most of recent digital cameras generally have not only a still image recording function but also a moving image recording function, and can record a shot moving image as video data in various video formats, including, for example, Motion JPEG (Joint Photographic coding Experts Group) format, and MPEG (Moving Picture coding Experts Group) format.

Meanwhile, in the digital camera that enables the retroaction of the time for the click of the shutter as mentioned above, the series of object images cyclically stored in the memory card may be used as a moving image. Accordingly, also in a digital camera having the moving image recording function, a predetermined number of object images taken at even intervals are temporarily and cyclically stored in the memory card, for example, in a recording standby state. As a result, at the moment of a recording and saving instruction by a shutter operation (release operation) or the like, it is possible to record a past moving image with the latest shot object image at the end.

In this case, however, a user cannot know the contents of the moving image to be recorded actually, or the accumulation condition of the object images forming the moving image, the accumulation condition including the number of effective object images (frame images) or a period of time (from the start scene to the end scene) of the object images until the user actually performs a shutter operation, etc. Therefore, it is difficult for the user to determine a timing of the shutter operation, etc. in recording a desired moving image, which has been a problem in the prior art.

BRIEF SUMMARY OF THE INVENTION

The present invention is directed to method and apparatus that substantially obviates one or more of the problems due to limitations and disadvantages of the related art.

According to an embodiment of the present invention, a moving-image recording device comprises:

a memory which receives frame images and stores a predetermined amount of recent frame images while updating the stored frame images;

a display which displays the received frame images as a moving image on a display screen;

a selector which selects a predetermined number of frame images among the frame images stored in the memory while updating the selected frame images;

a display controller which displays the selected frame images as still images in addition to the moving image on the display screen while updating the displayed frame images; and a recording unit which records the frame images stored in the memory as a moving image file in response to a recording instruction.

According to another embodiment of the present invention, a moving-image recording device comprising:

a display which displays a moving image on a display screen;

a memory which stores a predetermined amount of frame images included in the moving image while updating the stored frame images;

a memory controller which starts storing of the predetermined amount of frame images in response to a start instruction;

a detector which detects an amount of frame images stored in the memory;

a display controller which displays the detected amount of frame images in addition to the moving image on the display screen while updating the displayed frame images; and a recording unit which records the frame images stored in the memory as a moving image file in response to a recording instruction.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 1 is a block diagram showing a digital camera according to embodiments of the present invention;

DETAILED DESCRIPTION OF THE INVENTION

First Embodiment

Figure 2A:
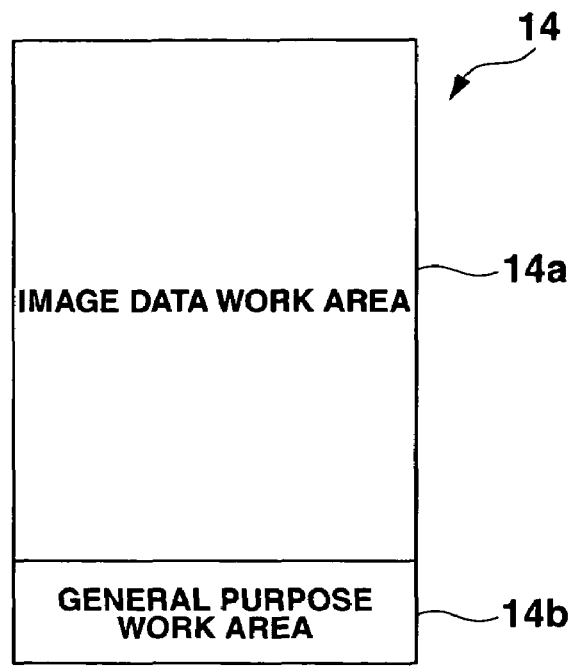
FIGS. 2A and 2B are schematic diagrams each showing a memory space in a built-in memory.

FIG. 1 is a block diagram showing a digital camera common to embodiments according to the present invention. The digital camera has, in addition to a still image mode and a moving image mode general as recording modes, a past movie mode that enables to record a past moving image with the latest stored object image at the end at the moment when a shutter operation is performed, and has the following configuration.

Specifically, the digital camera includes a camera main body 1, and a recording medium, such as a semiconductor memory card 20 that is detachable to and attachable from the camera main body 1. An optical system 2 including a zoom lens and a focus lens and a CD 3 are disposed in the camera main body 1. The CD 3 operates as imaging means, and is driven by driving signals transmitted from a timing generator 7, and photoelectrically converts an optical image of an object to an output imaging signal thereof. The output signal from the CD 3 is subjected to correlation double sampling and gain adjustment in a CDS (Correlation Double Sampling) circuit 4, and then converted into a digital signal by an A/D converting circuit 5. The A/D-converted imaging signal is input to a DSP (Digital Signal Processing) unit 6, where processes including pedestal clamping are performed on the input signal, and then converted into a brightness (Y) signal and a color difference (UV) signal by a brightness/color difference matrix circuit in the unit. In the DSP unit 6, processes for improving image quality such as auto iris, auto white balance, and edge enhancement are also performed.

YUV data converted by the DSP unit 6 is converted into a preset image size by a resolution converting block 8, and then, data for one frame is sequentially stored in a built-in memory 14 (for example, SDRAM). The YUV data for one frame stored in the built-in memory 14 is transmitted to a display controller 11, and converted into a video signal therein. Thereafter, the converted signal is displayed as a through image, i.e., a moving image by a liquid crystal display (LCD) 12. The DSP unit 6 and the resolution converting block 8 operate as image generating means, and the LCD 12 operates as moving image display means.

The YUV data for one frame stored in the built-in memory 14 at recording in the still image mode is compressed into a JPEG format or the like by means of a data compressing and expanding block 9, and then coded, and made into a file in the built-in memory 14. Thereafter, the data is recorded as still image data (a still image file) via a media controller 10 to a recording medium 20 operating as recording and saving means.

The YUV data stored in the built-in memory 14 at recording in the moving image mode is transmitted to the data compressing and expanding block 9, and compressed by a codec of a predetermined moving image recording format (for example, Motion-JPEG or MPEG) and then coded. Finally, the data is recorded as a moving image file in the recording medium 20 via the media controller 10. The frame rate in recording a moving image is determined by a timing signal created by the timing generator 7, and the compression rate of data to be coded is determined by a quantization table value in the data compressing and expanding block 9.

The data compressing and expanding block 9 expands data of a still image or a moving image read from the recording medium 20 at the moment of reproducing the still image or the moving image, and develops the data in the built-in memory 14 as still image data and frame data of a moving image. The developed image is transmitted to the display controller 11, and converted into a video signal therein, and then displayed as a reproduction image by the LCD 12. On the LCD 12, not only the through image and the reproduction image, but also a menu screen and a setting screen for selecting and setting various functions in the digital camera as necessary are displayed.

An audio processing block 15 converts audio input to a microphone 16 built in the camera main body 1 at the moment of recording a moving image into a digital signal, compresses the digital signal, and then transmit the compressed signal as audio data to the built-in memory 14. The audio data transmitted to the built-in memory 14 together with frame data is sequentially written as stream data into the recording medium 20. At the moment of reproducing the moving image, the audio processing block 15 decodes the audio data transmitted from the built-in memory 14, converts the audio data into an analog audio signal, and then outputs the data as audio from a built-in speaker 17 built in the camera main body 1.

A key input block 18 includes operation keys such as a power key, a mode switching key, a shutter key, a menu key, and a set key, and outputs a key input signal corresponding to a user's key operation to the CPU 13. The shutter key is used to instruct recording in the still image mode, is used to instruct start/end of recording in the normal moving image mode, and is also used to instruct recording and saving in the past movie mode.

Each of the above blocks is controlled by the CPU 13, and programs and data necessary for the CPU 13 to control the respective blocks are stored in a program memory 19 as a programmable nonvolatile memory such as an EEPROM or a flash memory. The CPU 13 includes functions of selecting means, display control means, and determining means by performing its operations based on the above programs and key input signals. Setting data concerning the system and respective functions set by the user are also stored in the program memory 19.

Figure 2B:
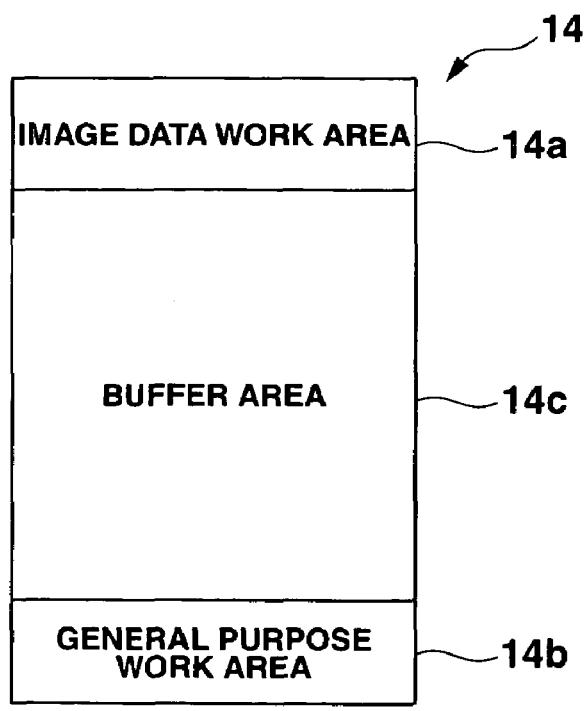

The built-in memory 14, as shown in FIG. 2A, has allocated therein: an image data work area 14a where data for one frame to be displayed as the through image described above is stored and updated; and a general purpose work area 14b that is used as a working memory of the CPU 13. Further, at the moment of recording in the past movie mode to be described later herein, as shown in FIG. 2B, a buffer area 14c for temporarily storing frame data (still image data) for several frames that form a moving image for recordable movie time (for five seconds in the present invention) is allocated. Thereby, the built-in memory 14 operates as temporary storage means.

Figure 3:
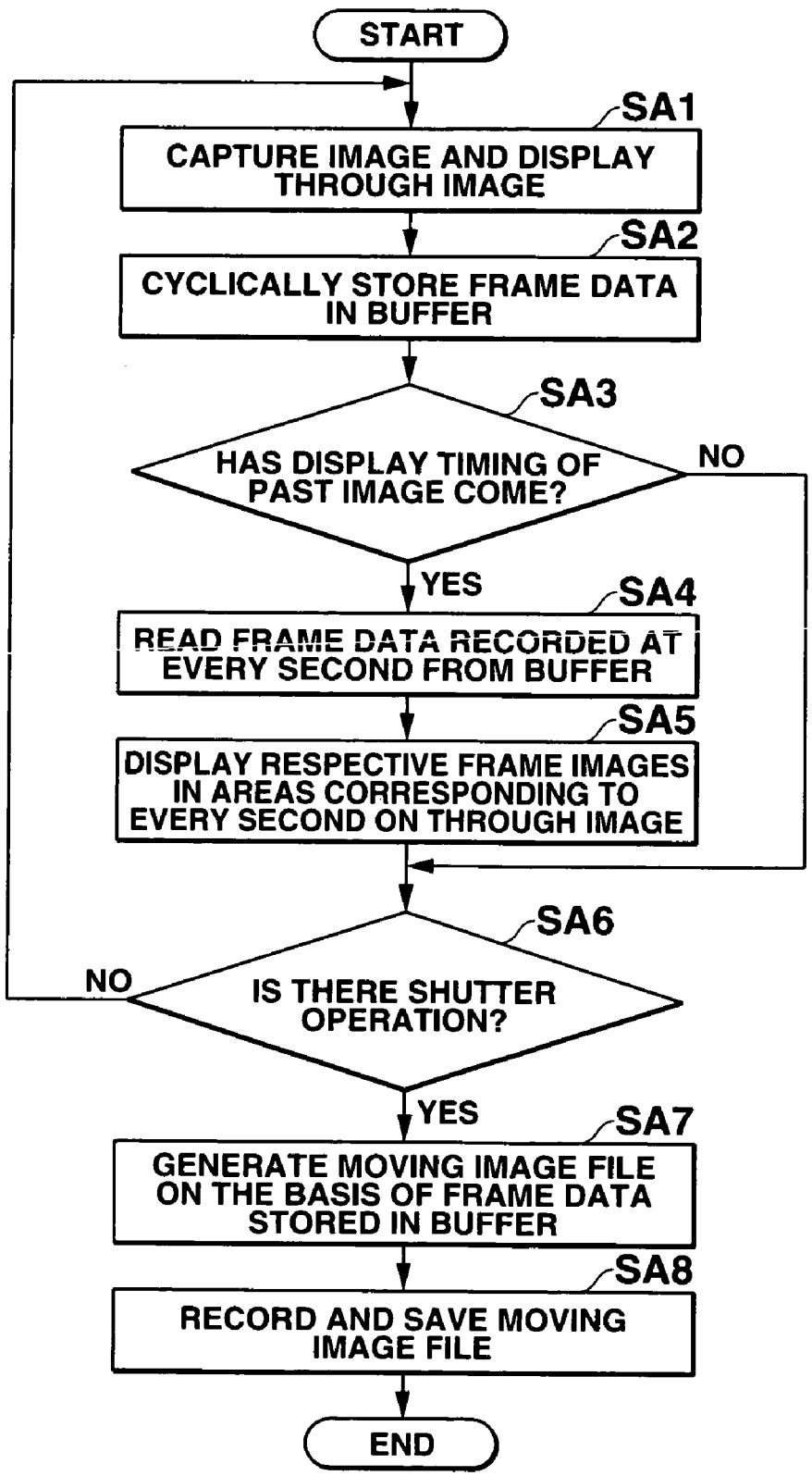
FIG. 3 is a flow chart showing the contents of a video recording process in a past movie mode in accordance with a first embodiment.

In the digital camera having the above configuration, the operation at the moment when the past movie mode is selected by the user at recording will be explained. FIG. 3 is a flow chart showing the contents of a past recording process executed by the CPU 13.

When the past recording process is started, the CPU 13 drives the CD 3 at a cycle corresponding to the frame rate of a moving image to be recorded in the past movie mode, and starts acquiring object images in the image data work area 14a of the built-in memory 14, and displaying the through image in the LCD 12 (step SA1). Then, the CPU 13 generates still image data (hereinafter, referred to as frame data) in the size for past movie from the data of the object images acquired in the image data work area 14a, and stores the frame data in the buffer area 14c (step SA2).

Steps SA1 and SA2 are repeated at the time corresponding to the frame rate, and continue to update the through image and to generate and store the frame data. However, the storage to the buffer area 14c is cyclically performed with the data for recordable movie time (five seconds) as the upper limit. More specifically, once the data for the recordable time is stored, a process wherein the oldest data is deleted and new frame data is stored is repeated on and after that time.

Then, at every time when the display timing of the past image comes around (herein at every one second) (YES in step SA3), frame data recorded at every second (i.e., past five seconds ago, four seconds ago, . . . , one second ago) are read from the buffer area 14c (step SA4), and frame images (still images) based on the frame data are overwritten on composition areas determined in correspondence to the respective seconds, in a through image, and composed and displayed (step SA5).

Figure 4:
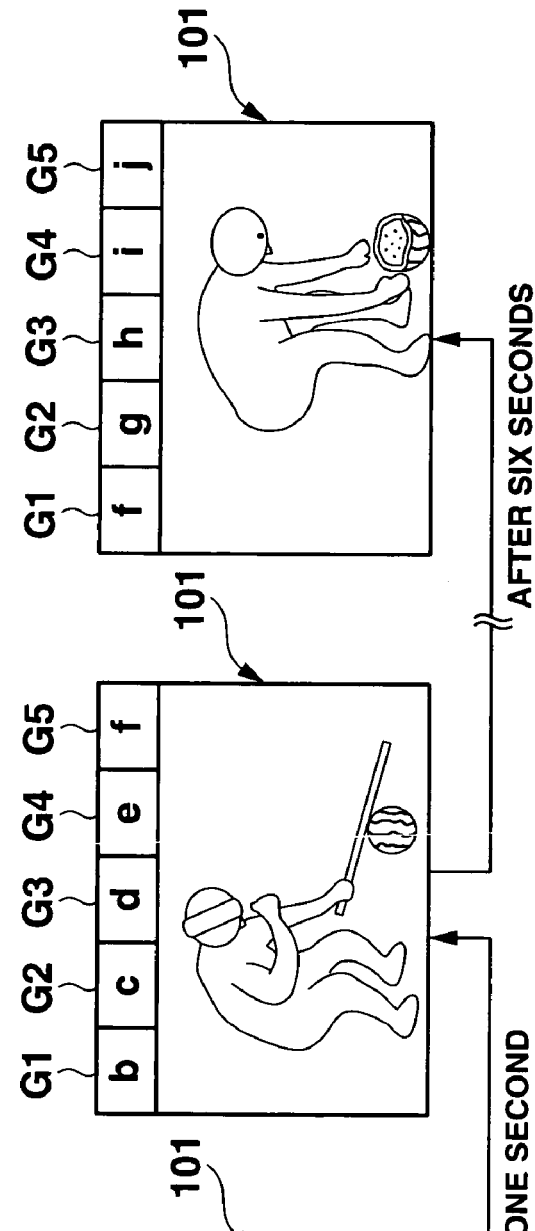
FIGS. 4A, 4B, 4C and 4D are views showing changes of an LCD display screen during video recording according to the first embodiment.

FIGS. 4A to 4D are views showing an example of the condition. FIG. 4A schematically shows frame images "a," "b," . . . at one-second intervals of frame images corresponding to the frame rate, the frame images being recorded sequentially and cyclically stored in the buffer area 14c. FIGS. 4B to 4D show examples of a through image 101 wherein the frame images "a," "b," . . . are overwritten and composed. In the present embodiment, the composition areas where frame images are composed are five areas G1 to G5 arranged along the upper side of the through image 101, and the respective areas correspond to the every second of past five seconds ago to past one second ago from the left end. Meanwhile, for the period of five seconds from the start of storing frame data, frame data of a part of all the seconds is not stored in the buffer area 14c. Therefore, for that period, only the frame images that have been acquired at the time point are displayed on the respectively corresponding composition areas. Further, after the lapse of five seconds from the start of storing frame data, the frame images displayed in the areas G2 to G5 transfer to the areas G1 to G4 at every one second, and a new frame image is displayed in the area G5, as shown in FIGS. 4B to 4D.

Then, in the repetition of the update of the through image, cyclic storage of frame data to the buffer area 14c, and display (update) of frame image at every display timing of the past image described above, if there is a recording and saving instruction (capturing end instruction) by the shutter key (YES in step SA6), the frame data stored in the buffer area 14c is read, and a moving image file based on the read frame data is generated (step SA7). Thereafter, the generated moving image file is recorded and saved in the recording medium 20 (step SA8), and the past recording process is completed.

As explained above, at the moment of recording moving image in the past movie mode, five frame images for past five seconds are displayed together with the through image 101. Accordingly, from the five frame images for past five seconds, the user knows the contents of the recordable moving image at the current time point, and the through image, i.e., the current actions of the object at the same time. Consequently, it is possible for the user to precisely determine the shutter timing necessary for recording the moving image that the user intends to.

Therefore, in the case where the recordable movie time for the PAST capture mode is relatively short like, for example, the present embodiment (for example, five seconds) but the frame images for past seconds are not displayed, the user does not know the contents of the moving image to be recorded actually, or the accumulation condition of the object images forming the moving image. Therefore, there is a situation where the head portion of the moving image may be lost owing to delay in the shutter timing, so that an important moment that the user intends to record may be failed in recording. However, it is possible to prevent such a situation from occurring.

Further, in the embodiment, the oldest frame image of five seconds ago among the plural frame images displayed together with the through image 101 is displayed. As a result, it is possible for the user to know the head portion of the recordable moving image, thereby determining the shutter timing precisely. In addition, the frame images to be displayed together with the through image 101 are images divided at one-second intervals, namely, they are images at time points into which the recording time of the moving image is divided at even intervals. Therefore, it is possible to let the user know the contents of the entire change of the moving image. Moreover, since the frame images displayed in the areas G2 to G5 move to the areas G1 to G4, and a new frame image is displayed in the area G5, frame images are easy to see, so that it is possible to easily grasp the contents of recordable moving image.

Meanwhile, in the embodiment, the recordable movie time is set to five seconds, and frame images at one-second intervals are selected and displayed in the areas G1 to G5, but these time values may be changed appropriately as necessary. In addition, the update interval of the frame images to be displayed in the areas G1 to G5 is set to one second, but this time value may be also changed appropriately. For example, the update interval of frame images may be set same as the update interval of the through image 101, whereby five moving images of different time difference with respect to the through image may be displayed in the areas G1 to G5. Further, for example, from a series of frame images stored in the buffer area 14c, an image having a large change in the motion from the previous image may be selected (extracted), and the extracted image may be displayed in the area G3 and preceding and succeeding images may be displayed in the areas G1, G2 and G4, G5. In this case, it is possible for the user to know characteristic portions of the contents of recorded moving image, thereby determining the shutter timing further precisely.

Second Embodiment

Figure 5:
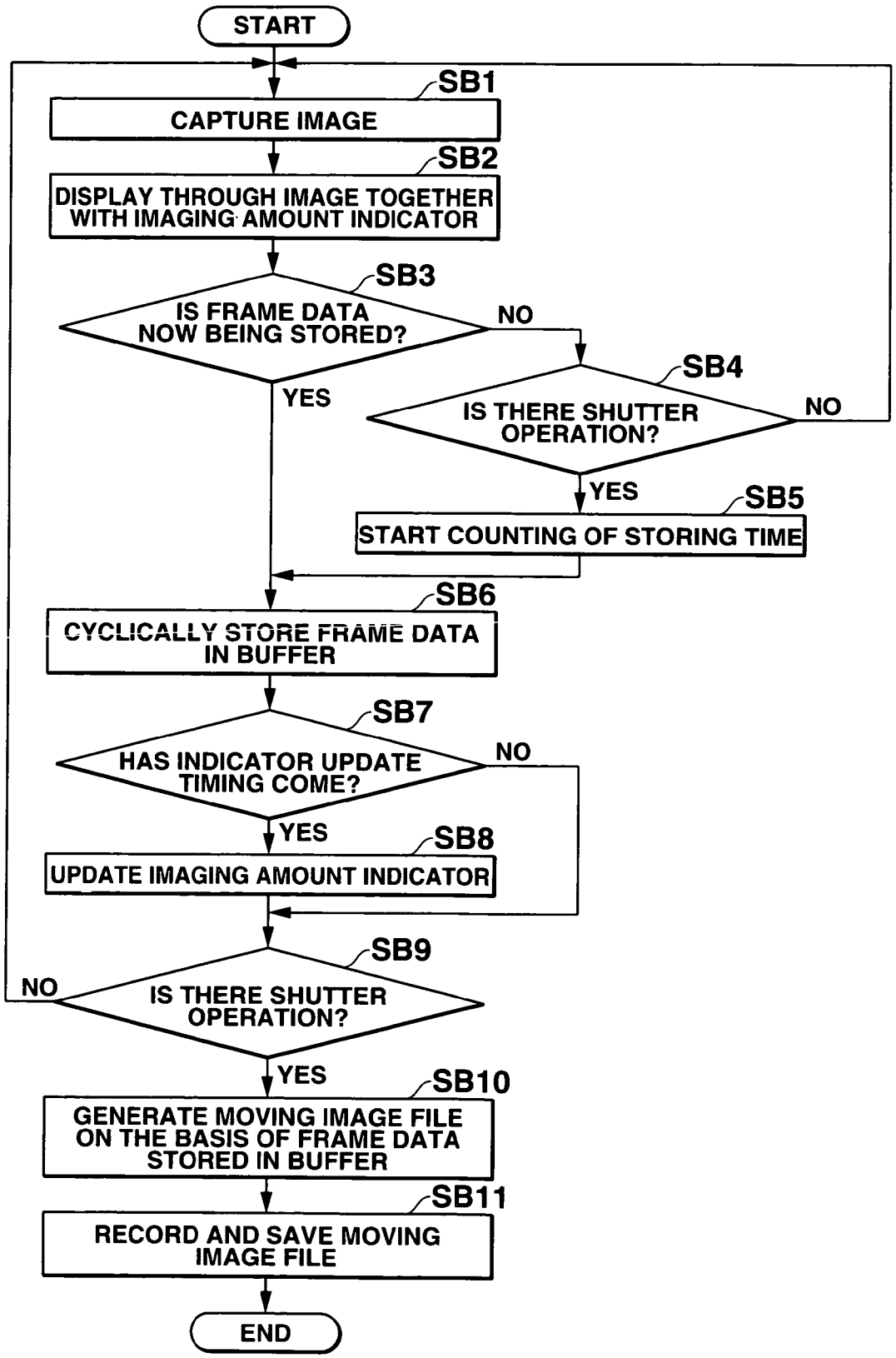
FIG. 5 is a flow chart showing the contents of a video recording process in a past movie mode in accordance with a second embodiment.

Next, a second embodiment of the present invention will be explained hereinafter. According to the second embodiment, in a digital camera of the configuration described above, the CPU 13 operates as first determining means, second determining means, storage control means, acquiring means, and display control means, whereby, when the past movie mode is selected, the past recording process shown in FIG. 5 is performed.

More specifically, when the past recording process is started, the CPU 13 drives the CD 3 at a cycle corresponding to the frame rate of the moving image to be recorded in the past movie mode, and starts acquiring an object image to the image data work area 14a of the built-in memory 14 (step SB1), and starts displaying the through image on the display screen of the LCD 12 which displays a recording amount indicator (step SB2).

Figure 6A:
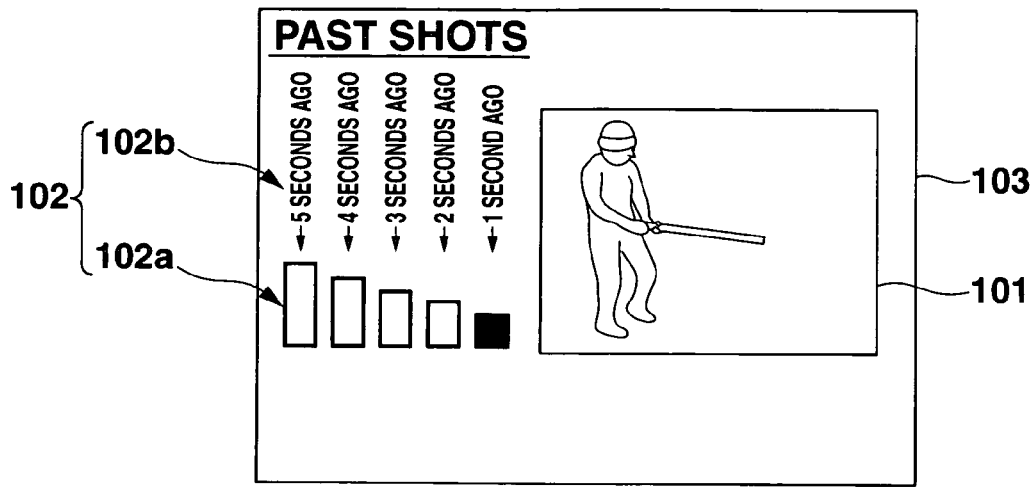
FIGS. 6A, 6B and 6C are views showing changes of an LCD display screen during video recording according to the second embodiment.
Figure 6B:
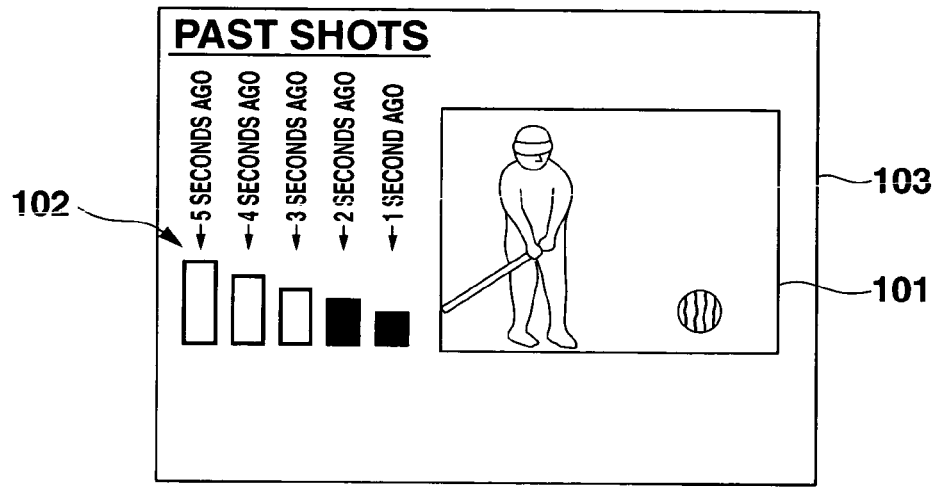
Figure 6C:
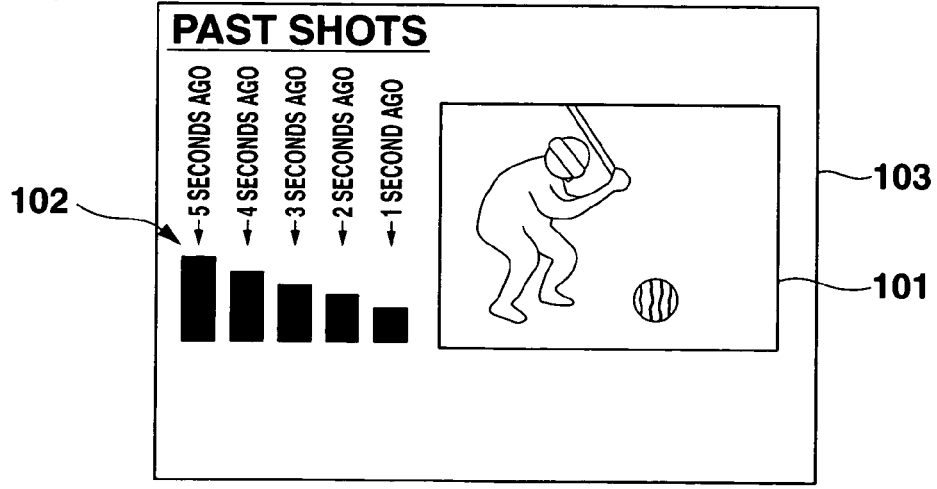

FIGS. 6A to 6C are views each showing a display screen 103 of the LCD 12 in a state in which the recording amount indicator 102 and the through image 101 are displayed. The recording amount indicator 102 indicates the amount of frame images stored in the buffer area 14c of the built-in memory 14. In the embodiment, the indicator 102 includes five gauges 102a of different heights arranged horizontally, showing the recording amount in unit of second, and captions ("one second ago" to "five second ago") 102b showing the storage amount that each of the gauges 102a means.

Further, until a first operation of the shutter key (storage start instruction) is made after setting the past movie mode (NO in both of steps SB3, SB4), the processes of steps SB1, SB2 are repeated and the through image 101 is updated. When the shutter key is operated (step SB4), counting of the storing time of the moving image is started (step SB5), and the generation of frame data and the aforementioned cyclic storage to the buffer area 14c of the built-in memory 14 are started (step SB6). Also in the embodiment, the amount of frame data that can be stored in the buffer area 14c, i.e., the recordable movie time is set to five seconds. On and after the process, the determination result in step SB3 becomes YES, the update of the through image and the generation and storage of frame data are continued.

During the period, on the other hand, at every time when the update timing of the recording amount indicator 102 comes around (herein at every one second) (Yes in step SB7), the recording amount indicator 102 is updated (step SB8). That is, as shown in FIGS. 6A to 6C, the five gauges 102a are changed into the lighting status (filled status in the figure) one by one sequentially. Although it is not illustrated, all the gauges 102a get in the lighting state when the recording time becomes more than five seconds, and therefore, the process of the step SB8 is skipped on and after the time.

During the repetition of the update of the through image, the cyclic storage of frame data to the buffer area 14c, and the update of the recording amount indicator 102 mentioned above, if there is a second operation of the shutter key (recording and saving instruction) (YES in step SB9), the frame data stored in the buffer area 14c at the time point is read, and a moving image file based on the read frame data is generated (step SB10). Thereafter, the generated moving image file is recorded and saved in the recording medium 20 (step SB11), and the past recording process is completed.

As explained above, in the embodiment, the through image 101 and the recording amount indicator 102 are displayed at the moment of recording a moving image in the past movie mode, so that it is possible for the user to know the length of the recordable moving image, and the through image, i.e., the actions of the current object at the same time. Therefore, it is possible to precisely determine the shutter timing necessary to record a moving image that the user intends to. For example, even in the case where a recordable movie time is relatively long, different from the present embodiment, it is possible to precisely determine at what time point the shutter operation should be made when recording a desired length of a moving image. Further, since the length of the moving image to be recorded is visually displayed by the recording amount indicator 102, the user can recognize the length in a moment.

In the embodiment, the length of the recordable moving image at the current time point is informed. However, instead thereof, other element that shows the storage amount of frame data in the buffer area 14c, for example, the number of frame images forming the recordable moving image at the current time point (the number of frames) may be displayed as amount information of the invention. In this case as well, it is possible for the user to precisely determine the shutter timing necessary for recording the moving image that the user intends to.

Furthermore, the recordable length of the moving image is visually displayed by the recording amount indicator 102 mentioned above. However, instead thereof, the recordable length of the moving image, the number of frame images configuring the recordable moving image, and the like may be visually displayed in other display manners. In this case, the length of the moving image and the number of frame images may be displayed as in incremental steps as the recording amount indicator 102, or may be displayed continuously by use of a band-shaped gauge, a ring-shaped gauge or the like. Further, in the embodiment, the recording amount indicator 102 is displayed together with the through image 101 on the display screen of the LCD 12. However, the recording amount indicator 102 and the like may be composed with the through image 101, for example, they may be overwritten and composed on the through image 101 and displayed such that the through image 101 can be seen through.

Herein, the embodiments explained above describes the case where the past movie mode is the recording mode to record only past moving image with the object image stored just before the time point of the shutter operation at the end. However, the invention is not limited to this, but the operation described above may be performed in the following recording modes. For example, in a recording mode wherein the past moving image is recorded at the time point of the shutter operation, and a normal still image recording process is performed at the same time, or in another recording mode wherein the past moving image is recorded at the time point of the shutter operation, and a normal moving image recording process is performed at the same time, the operation described above may be performed. Further, in the recording mode wherein a normal moving image recording process is performed at the same time with the shutter operation, the past moving image before the shutter operation and a moving image shot according to the shutter operation may be collectively recorded and saved as a single moving image file.

Furthermore, in the embodiments, the present invention is applied to a digital camera having a moving image recording function, but not limited thereto. The invention may be also applied to a camera device built in a personal digital assistant such as a cellular phone. Moreover, in the embodiments, the present invention is applied to a device that records a moving image composed of still images (frame images) taken at even intervals. However, the invention may be applied also to a device that records a moving image composed of a series of image data transmitted via airwave.

What is claimed is:
1. A moving-image recording device comprising:
  an imaging unit which cyclically captures an image of an object at a moving picture frame rate;
  an image creation unit which creates a series of frame images forming a moving picture based on images captured by the imaging unit;

a temporary memory which temporarily stores the series of frame images forming the moving picture of a predetermined period of time, wherein when a new frame image is created by the image creation unit, an oldest frame image is deleted and the new frame image is stored;

a moving picture display unit which displays the series of frame images forming the moving picture on a display screen while updating the series of frame images at the moving picture frame rate;

a selective reading unit which reads first frame images among the series of frame images temporarily stored in the temporary memory when a predetermined display timing arrives, the read first frame images having a time interval therebetween which is obtained by equally dividing the predetermined period of time;

a display controller which displays the first frame images which are read by the selective reading unit one by one, on the display screen of the moving picture display unit together with the series of the frame images with an arrangement of keeping a chronological order while updating the displayed first frame images;

a determining unit which determines whether or not a recording instruction of a moving image is issued; and a recording unit which records the moving picture when the determining unit determines that the recording instruction of the moving image is issued, the moving picture being formed of frame images which are stored in the temporary memory and stored before a time when the determining unit determines that the recording instruction of the moving image is issued.

2. The device according to claim 1, wherein the first frame images include the oldest frame image among the series of the frame images stored in the temporary memory.

3. The device according to claim 1, wherein the display controller displays the first frame images which are read by the selective reading unit one by one, on the display screen together with the series of frame images while shifting a display position of the first frame images in such a manner that the oldest frame image is deleted and a latest image is added.

4. A moving-image recording device comprising:
an imaging unit which cyclically captures an image of an object at a moving picture frame rate;

an image creation unit which creates a series of frame images forming a moving picture based on images captured by the imaging unit;

a temporary memory which temporarily stores the series of frame images forming the moving picture of a predetermined period of time, wherein when a new frame image is created by the image creation unit, an oldest frame image is deleted and the new frame image is stored;

a moving picture display unit which displays the series of frame images forming the moving picture on a display screen while updating the series of frame images at the moving picture frame rate;

a selective reading unit which reads first frame images among the series of frame images temporarily stored in the temporary memory when a predetermined display timing arrives, at least one of the read first frame images having a significant change in image contents from a preceding frame image;

a display controller which displays the first frame images which are read by the selective reading unit one by one, on the display screen of the moving picture display unit together with the series of the frame images with an arrangement of keeping a chronological order while updating the displayed first frame images;

a determining unit which determines whether or not a recording instruction of a moving image is issued; and a recording unit which records the moving picture when the determining unit determines that the recording instruction of the moving image is issued, the moving picture being formed of frame images which are stored in the temporary memory and stored before a time when the determining unit determines that the recording instruction of the moving image is issued.

5. A method for moving-image recording comprising:
operating an image capturing device to cyclically capture an image of an object at a moving picture frame rate;

creating a series of frame images forming a moving picture based on the captured images;

temporarily storing the series of frame images forming the moving picture of a predetermined period of time, wherein when a new frame image is created, an oldest frame image is deleted and the new frame image is stored;

displaying the series of frame images forming the moving picture on a display screen while updating the series of frame images at the moving picture frame rate;

reading first frame images among the series of frame images temporarily stored when a predetermined display timing arrives, the read first frame images having a time interval therebetween which is obtained by equally dividing the predetermined period of time;

displaying the first frame images read one by one on the display screen together with the series of the frame images with an arrangement of keeping a chronological order while updating the displayed first frame images;

determining whether or not a recording instruction of a moving image is issued; and recording the moving picture when it is determined that the recording instruction of the moving image is issued, the moving picture being formed of frame images which are stored before a time when it is determined that the recording instruction of the moving image is issued.

6. A computer-readable recording medium having a computer program stored thereon that is executable by a computer to cause the computer to perform moving-image recording functions comprising:

cyclically capturing an image of an object at a moving picture frame rate;

creating a series of frame images forming a moving picture based on the captured images;

temporarily storing the series of frame images forming the moving picture of a predetermined period of time, wherein when a new frame image is created, an oldest frame image is deleted and the new frame image is stored;

displaying the series of frame images forming the moving picture on a display screen while updating the series of frame images at the moving picture frame rate;

reading first frame images among the series frame images temporarily stored when a predetermined display timing arrives, the read first frame images having a time interval therebetween which is obtained by equally dividing the predetermined period of time;

displaying the first frame images read one by one on the display screen together with the series of the frame images with an arrangement of keeping a chronological order while updating the displayed first frame images;

determining whether or not a recording instruction of a moving image is issued; and recording the moving picture when it is determined that the recording instruction of the moving image is issued, the moving picture being formed of frame images which are stored before a time when it is determined that the recording instruction of the moving image is issued.

7. A moving-image recording device comprising:

an imaging unit which cyclically captures an image of an object at a moving picture frame rate;

an image creation unit which creates a series of frame images forming a moving picture based on images captured by the imaging unit;

a temporary memory which temporarily stores the series of frame images forming the moving picture of a predetermined period of time, wherein when a new frame image is created by the image creation unit, an oldest frame image is deleted and the new frame image is stored;

a moving picture display unit which displays the series of frame images forming the moving picture on a display screen while updating the series of frame images at the moving picture frame rate;

a first determining unit which determines whether or not a storage instruction of a frame image is issued;

a storing control unit which causes the temporary memory to start storing the series of the frame images forming the moving picture of the predetermined period of time when the first determining unit determines that the storage instruction of the frame image is issued;

an acquiring unit which acquires a series amount of the frame images stored in the temporary memory;

a display controller which displays an indicator on a part of the display screen of the moving picture display unit together with the series of the frame images stored in the temporary memory, wherein the indicator visually indicates a length of the moving picture stored in the temporary memory based on the series amount of the frame images acquired by the acquiring unit and wherein the indicator is updated;

a second determining unit which determines whether or not a recording instruction of a moving image is issued; and a recording unit which records the moving picture when the second determining unit determines that the recording instruction of the moving image is issued, the moving picture being formed of frame images which are stored in the temporary memory and stored before a time when the second determining unit determines that the recording instruction of the moving image is issued.

8. A method for moving-image recording comprising:

operating an image capturing device to cyclically capture an image of an object at a moving picture frame rate;

creating a series of frame images forming a moving picture based on the captured images;

storing the series of frame images forming the moving picture of a predetermined period of time, wherein when a new frame image is created, an oldest frame image is deleted and the new frame image is stored;

displaying the series of frame images forming the moving picture on a display screen while updating the series of frame images at the moving picture frame rate;

determining whether or not a storage instruction of a frame image is issued;

causing the storing of the series of the frame images forming the moving picture of the predetermined period of time to start when it is determined that the storage instruction of the frame image is issued;

acquiring a series amount of the stored frame images;

displaying an indicator on a part of the display screen together with the series of the stored frame images, wherein the indicator visually indicates a length of the stored moving picture based on the acquired series amount of the frame images and wherein the indicator is updated;

determining whether or not a recording instruction of a moving image is issued; and recording the moving picture when it is determined that the recording instruction of the moving image is issued, the moving picture being formed of frame images which are stored before a time when it is determined that the recording instruction of the moving image is issue.

9. A computer-readable recording medium having a computer program stored thereon that is executable by a computer to cause the computer to perform moving-image recording functions comprising:

cyclically capturing an image of an object at a moving picture frame rate;

creating a series of frame images forming a moving picture based on the captured images;

storing the series of frame images forming the moving picture of a predetermined period of time, wherein when a new frame image is created, an oldest frame image is deleted and the new frame image is stored;

displaying the series of frame images forming the moving picture on a display screen while updating the series of frame images at the moving picture frame rate;

determining whether or not a storage instruction of a frame image is issued;

causing the storing of the series of the frame images forming the moving picture of the predetermined period of time to start when it is determined that the storage instruction of the frame image is issued;

acquiring a series amount of the stored frame images;

displaying an indicator on a part of the display screen together with the series of the stored frame images, wherein the indicator visually indicates a length of the stored moving picture based on the acquired series amount of the frame images and wherein the indicator is updated;

determining whether or not a recording instruction of a moving image is issued; and recording the moving picture when it is determined that the recording instruction of the moving image is issued, the moving picture being formed of frame images which are stored before a time when it is determined that the recording instruction of the moving image is issued.

* * * * *